UNITED STATES PATENT OFFICE.

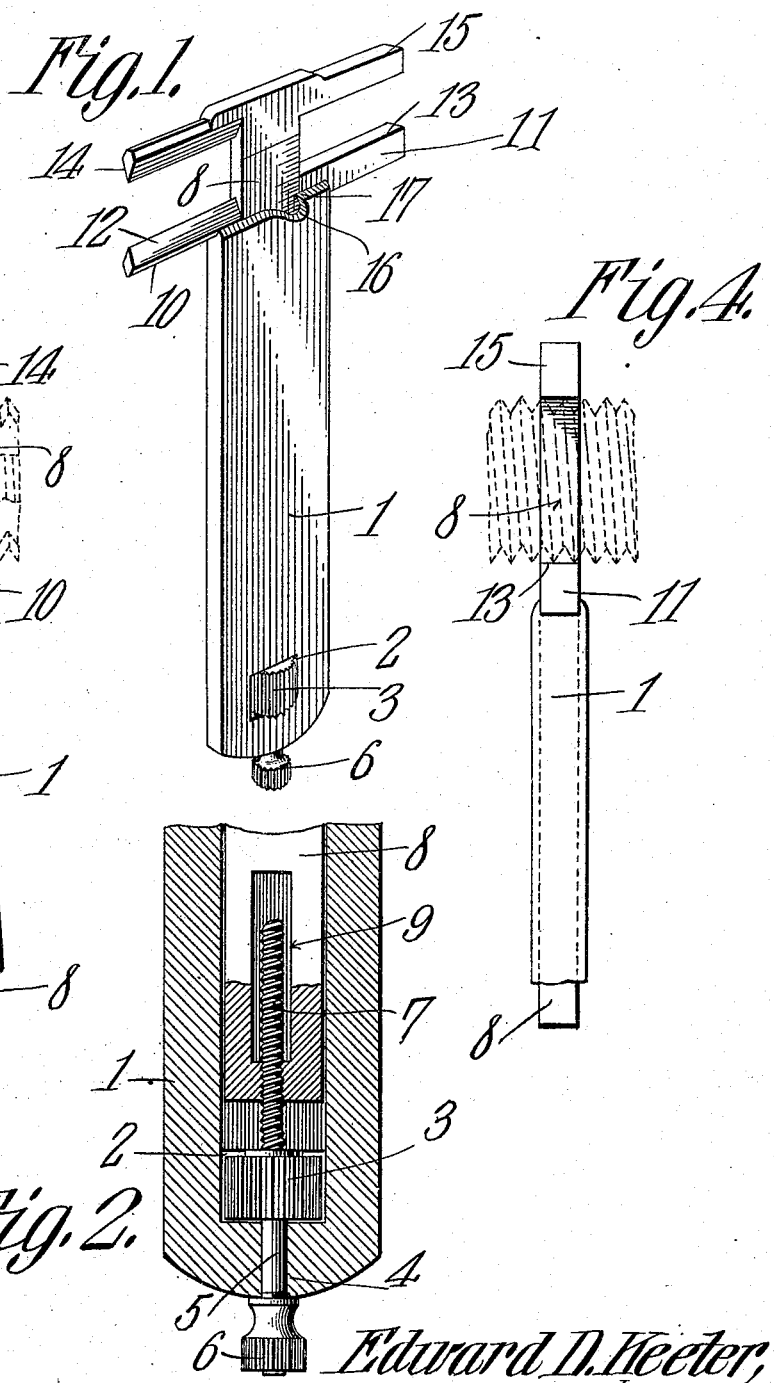

EDWARD D. KEETER, OF SALISBURY, NORTH CAROLINA.

GAGE.

933,309.  Specification of Letters Patent.  Patented Sept. 7, 1909.

Application filed August 31, 1908. Serial No. 451,024.

*To all whom it may concern:*

Be it known that I, EDWARD D. KEETER, a citizen of the United States, residing at Salisbury, in the county of Rowan and State of North Carolina, have invented a new and useful Gage, of which the following is a specification.

This invention relates to gages and is more particularly designed for determining the diameter of a bolt or tap exclusive of the threads or, in other words, for determining the smallest diameter of a tap or bolt, and which is also designed for indicating the greatest diameter of a threaded object.

Heretofore it has been difficult to determine what size of a drill should be employed prior to the insertion of a tap of a predetermined size. If the bore into which the tap is forced is too small the tap is likely to become broken and a considerable waste of material results. On the other hand should the bore be too large the interior threads produced by the tap would not be of the proper depth. In order that the proper diameter of the bore can be readily determined the present invention has been devised.

Another object of the invention is to provide means whereby the gage can be readily locked when set.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a perspective view of the gage. Fig. 2 is an enlarged transverse section through the end of the shank thereof. Fig. 3 is an edge view of a portion of the gage showing the manner in which the same is used to determine the smallest diameter of tap or bolt. Fig. 4 is a view of the opposite edge of the gage and showing the same in use for determining the greatest diameter of a threaded object.

Referring to the figures by characters of reference, 1 designates a hollow casing preferably rectangular in cross section and provided with apertures 2 in the faces thereof and in which rotates a nut 3. The free end of the casing is closed as indicated at 4 and revolubly mounted within said end is a stem 5 having a jam nut 6 thereon designed to bind against the end of the casing to hold the nut 3 against movement. A screw threaded stem 7 extends in the opposite direction from nut 3 and engages the threaded end of a shank 8 which is slidably mounted within the casing 1. A slot 9 is formed longitudinally within said shank and is designed to receive the end portion of the stem 7.

Oppositely extending arms 10 and 11 are formed with the casing 1 at the open end thereof and the arm 10 is provided with converging faces forming a knife edge 12, while the arm 11 has a flat working face 13 disposed in the same plane with the edge 12. Shank 8 extends between the arms 10 and 11 and is provided at its outer end with arms 14 and 15 which are similar to the arms 10 and 11. The faces of the shank are preferably graduated, one of said faces being provided with a hundredths scale while the other face is preferably laid off in sixty-fourths. It is of course to be understood, however, that other scales may be employed. The open end of casing 1 has notches or recesses 16 in opposite faces thereof so that points or indexes 17 are formed which are designed to accurately indicate the graduations to which the gage may be set.

In using the device herein described the jam nut 6 is loosened so as to permit the nut 3 to be freely rotated. Inasmuch as this nut is held against longitudinal movement by the walls of openings 2 it will be apparent that the rotation of nut 3 and stem 7 will result in the longitudinal movement of shank 8. When it is desired to bore a hole into an object, it being the intention to subsequently form threads within the bore, the tap of proper size is placed between the arms 10 and 14 and said arms are drawn toward each other until they fit between the threads at opposite points upon the tap. This operation has been illustrated in Fig. 3. The graduations upon the shank 8 will indicate the smallest diameter of the tap and the workman therefore selects a drill of the same diameter as that indicated by the gage. The difference between the diameter of the bore and the greatest diameter of the tap will therefore be equal to the depth of the thread upon the tap. By placing a bolt or other threaded object between the arms 11 and 15 the greatest diameter of said object can be quickly determined and, by deducting the smallest diameter from the greatest diameter of a bolt or other similar object the depth of the threads can be readily determined.

What is claimed is:

1. A gage for indicating the smallest and greatest diameters of a threaded object, comprising a casing, a graduated shank slidably mounted therein, means for securing the shank against movement within the casing, oppositely extending alining arms integral with the casing, and oppositely extending alining arms integral with the shank, the arms upon the shank being equidistant from the arms on the casing, and the shank and casing arms at one side of the gage being provided with longitudinally extending parallel knife-edges upon the adjoining faces thereof.

2. A gage comprising a casing, a graduated shank movably mounted with relation thereto, means for holding the shank and the casing against independent movement, oppositely extending arms upon the shank, one of said arms having a longitudinally extending knife edge and the other arm having a flat working face disposed in alinement with said knife edge, and oppositely extending arms upon the casing and parallel with the arms upon the shank, one of the casing arms having a longitudinally extending knife edge and the other casing arm having a flat working face alining therewith, the two arms with knife edges being disposed oppositely to each other and coöperating for measuring the smallest diameter of a threaded object, and the other two arms coöperating for measuring the greatest diameter of a threaded object, the graduations upon the shank coöperating with the casing to indicate the measurements obtained by each set of arms.

In testimony that I claim the foregoing as my own, I have hereto affixed my signature in the presence of two witnesses.

EDWARD D. KEETER.

Witnesses:
 JAS. M. WALKER,
 J. ROSS COLHOUN.